Nov. 10, 1970　　　K. M. KNAPP ET AL　　　3,538,531
PIPELINE PIG
Filed June 30, 1969
FIG. 1
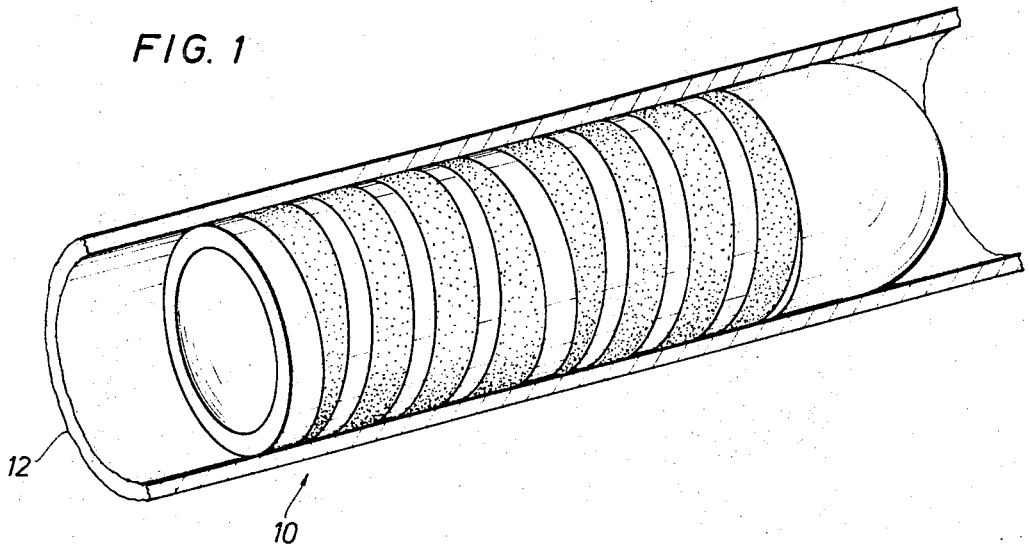
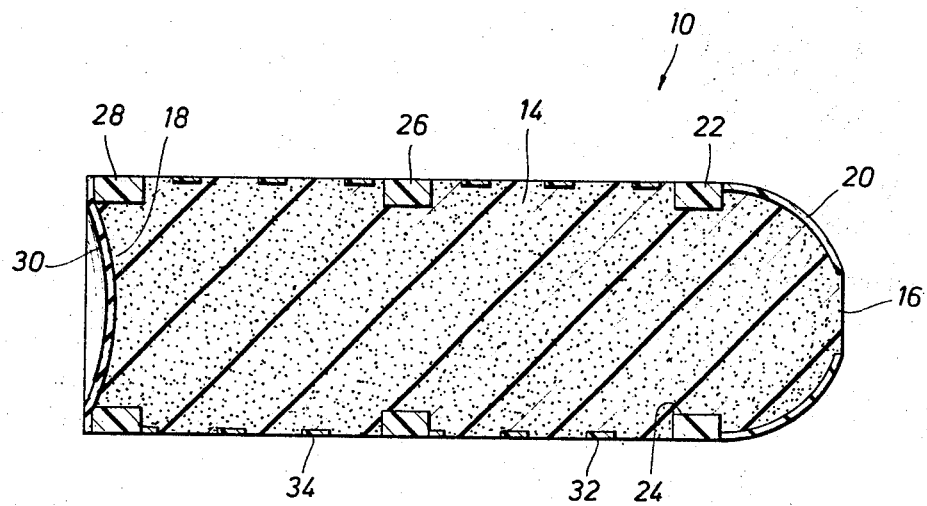
FIG. 2
Kenneth M. Knapp
Mary M. Knapp
INVENTORS
BY Donald Gunn
ATTORNEY

United States Patent Office

3,538,531
Patented Nov. 10, 1970

3,538,531
PIPELINE PIG
Kenneth M. Knapp and Mary M. Knapp, both of
1209 Hardy, Houston, Tex. 77020
Filed June 30, 1969, Ser. No. 837,410
Int. Cl. B08b 9/04
U.S. Cl. 15—104.06                                   4 Claims

ABSTRACT OF THE DISCLOSURE

A pipeline pig for passing through a pipeline to clear out accumulations, deposits on the wall, and liquid collecting at low spots in the pipeline, which preferably incorporates a bullet-shaped elongate plastic body of cross section comparable to that of the pipeline, preferably formed of a foamed plastic mass and including an encircling ring of tough nonfoamed plastic material having the same outer circumference as that of the plastic body which is located at the edge of contact of the bullet-shaped body to provide a wearing surface to extend the life of the pig. Additionally, other encircling rings of the same outer circumference may be incorporated in the body at the mid-point and at the rear end of the pig.

RELATED APPLICATIONS

Applicants have no presently pending related applications.

SUMMARY OF PROBLEM AND SOLUTION

Pipeline pigs have been provided heretofore for the cleaning of paraffin coatings on pipeline walls, other deposits, collection of debris, and even for removal of an accumulation of liquid in the gas line which typically collects at low places in the pipeline. These various and sundry uses all envision the introduction of a pipeline pig at a point of entry in the pipeline wherein the fluid being pumped through the pipeline forces the pig to a point downstream. The life of a pig may be measured by the number of miles of pipeline which it cleans. For instance, many pigs wear out in forty or fifty miles of pipeline, and it is rather uncommon to clean as much as one hundred miles of pipeline wtih one pig. It is with a view of providing a new and unobvious pig capable of traveling several hundred miles in a pipeline that the present invention is summarized as incorporating a bullet-shaped, elongate pipeline pig which includes a body of a foamed plastic material which is somewhat resilient, and which has encircling ring members which bear against the wall and which absorb the wear of the pig as it traverses the pipeline. Hence, several hundred miles of cleaning can be obtained from a single pig, and the rings, if desired, may be removed and replaced, or in the alternative, may be built-up to further extend the life of the pig.

Many objects and advantages of the present invention will become more readily apparent from a consideration of the included drawings and specification, wherein:

FIG. 1 is a perspective view showing the pig of the present invention within a pipeline; and, FIG. 2 is a sectional view through the pig of the present invention showing the location of the encircling protective ring members with respect to the plastic body.

Considering the invention broadly, attention is first directed to FIG. 1 of the drawings which illustrates a pipeline pig indicated generally by the numeral 10, located in a pipe 12. The pig 10 is forced through the pipeline 12 by the fluid flow which may be gaseous or liquid. The pressure may vary over a wide range, but may be, by way of example and not limitation, in the range of perhaps 500 to 1500 p.s.i., although lower and higher pressures have been known. The pipeline will extend indefinitely, perhaps several hundred miles, for the purpose of delivering a petrochemical product over a great distance. The pipe itself may be relatively small, or quite large, ranging as high as forty inches or greater, and nominal inside diameter. The cleaning and clearing problem solved by the use of the pipeline pig may vary widely. There may be an accumulation of loose matter in the pipeline, or in the instance of certain petroleum products, here is a tendency to form a paraffin coating on the wall from certain constituents in the oil. Moreover, pipelines for gaseous products will often pass through temperature gradients which cause a condensation of certain constituents, and an accumulation of liquid at a low place. It will be understood that the gas is forced to bubble through the liquid, and this likewise reduces the net volume flowing in the pipeline. Without regard to the nature of the accumulation, or its cause, the pipeline pig 10 is adapted to be used in a pipeline to clear the pipeline of the accumulation by forcing it downstream to a suitable collection point where the material may be either removed, dissolved in the flowing liquids, or otherwise disposed of. Consequently, the setting or context of the use of the pipeline pig is given by way of example, and not limitation.

Considering the pipeline pig 10, it is shown in detail in the sectional view of FIG. 2 which illustrates the body portion 14 as comprising an elongate bullet shaped mass. It is streamlined at the forward end as indicated by the numeral 16, and is essentially flat across the rear end as indicated by the numeral 18. The body 14 is preferably formed of a light weight flexible foam material, such as polyurethane, although other foamed olefins may be used. The foamed polyurethane of the preferred embodiment preferably has a density in the range of twenty to forty pounds per cubic foot, although these limits are not precisely drawn. The lower limit is determined in large part by the need to have enough material to have a structure of some strength, whereas the upper limit is, in part, determined by the economics of the material. Thus, the use of a foam having too high a density is too expensive, and the increased weight or density does not obtain measurably improved performance. The polyurethane material is preferably foamed to provide an open cell structure. A suitable foaming agent might be any of the commercially available Freon evolving gaseous agents, carbon dioxide evolving materials, and the like.

The numeral 16 indicates the forward or streamlined end of the pig 10. It is preferably formed of the plastic material without a distinct shoulder and curves forwardly to a point. As shown in the drawings, the forwardmost tip may actually be smooth, rounded, or even blunt, and a sharp point is not necessary. A significant factor is the rounding of the forward end of the pig to fair smoothly into the side wall for purposes which will be described. The numeral 20 indicates a thin skin coating formed on the exterior of the pig 10 to provide a long wearing surface on the forward nose. The skin 20 is preferably of nominal thickness, perhaps one quarter to three quarters inch thick, and is preferably a polyurethane elastomer joined to the plastic body 14. The skin is not normally contacted against the pipe wall, and hence, is expected to have relatively long life. In some models or versions of the pig of the present invention, the skin 20 on the leading nose or face of the pig may be omitted for sake of economy.

Immediately to the rear of the nose is provided a ring member indicated by the numeral 22. The ring member 22 is received in an encircling groove indicated by the numeral 24 in FIG. 2. The ring member 22 is of measurable thickness, perhaps two or three inches, to provide a substantial wearing member which is contacted against the wall of the pipe 12. The width of the ring member is subject to variation, but can be in the range of perhaps four to six inches in width to provide a suitable and adequate surface for contact against the inner face of the pipeline. The ring member 22 is preferably formed of a material compatible with the foam body 14, and again, the preferred version is polyurethane elastomer. The preferred material is measurably harder, having a reading of perhaps seventy durometer hardness, although this may be varied dependent on the circumstances of use. The diameter of the ring member 22 is equal to that of the body 14 so that it mounts flush with the outer wall. The location of the ring member is at the forward or leading edge of the cylindrical body which is contacted against the wall of the pipe 12. As noted above, the nose portion does not normally contact the side wall. Hence, the first point of contact is at the location of the ring member 22, which endures the brunt of the abrasive wiping action as the pig 10 travels through the pipeline. The cross sectional area of the ring member 22 is sufficient to provide adequate strength to the ring member 22 to prevent its deformation, extreme flexure or bending. It is not totally or perfectly stiff, inasmuch as it is mounted in a foam body which is readily flexible. However, since the ring member 22 is the point of contact against the pipe itself, there is a need for some stiffness in the ring member, and hence, the cross section area should be measurable to provide a ring member of suitable stiffness and with adequate material for long life.

While the foregoing has described the ring member 22, which is located at the forward portions of the pig 10, it will be noted that an additional ring member is found at 26 at the central portions. The ring member 26 is similar in material, size and shape to the ring member 22. Again, it is installed flush with the outer surface on the pig 10. More specifically, it is generally similar in most details to the ring member 22, and hence, a detailed elaboration at this juncture is believed unnecessary.

A third ring member 28 is found at the rear portions of the pig. The ring member 28 is immediately adjacent to a transversely extending impervious film member 30 which spans the full width of the rear end 18 of the pig. The member 30 is preferably dished in to present a concave face to the liquid which pushes the pig through the pipeline. The plastic body 14 is preferably formed with the face or indention generally defined at its rear end. The transverse member 30 which extends fully over the pig is preferably impervious and hence, the pressure in the pipeline acts on it. This creates a substantial load on the rear end of the pig 10, and this load in part causes the rear end to tend to flatten out or flare against the wall of the pipeline 12. When this occurs, the gripping or wiping action of the pig at the rearward portions of the cylindrical body is materially enhanced. This defines a point of substantial wear, and hence, the ring 28 is included at this location. In further particular, the transverse member 30 transfers the motive force to the ring member 30 to force it snugly against the pipeline. In a sense, the axial force acting on the pig tends to flare or expand the rearward end of the pig, which measurably enhances the wiping action of the pig. The ring member 28 is similar in all regards to the preferred ring members defined above.

In addition, the preferred embodiment of the present invention includes an encircling spiral shaped insert indicated by the numerals 32 and 34. The inserts 32 and 34 provide rotation to the pig 10 as it traverses the pipeline 12. This tends to equalize wear on the exterior and is somewhat protective of the body 14 of the pig. The spiral inserts 32 and 34 have a desired rate of twist, which is subject to variation over a wide range, it being appreciated that they may skid along the side wall of the pipe while also causing the pig 10 to rotate at a determined rate. The rate of rotation may be such that there is no skidding or slippage of the spiral members 32 and 34.

The fabrication of the device of the present invention should next be considered. The foam body 14 is preferably fabricated by casting, wherein the foam material is introduced into a cavity of a desired size and shape. It may be cast with slots or grooves for the ring members. When the plastic body 14 has been formed, it is placed in a second mold and a suitable olefin material is introduced into the exposed or open groove left from the formation of the body 14. It is immaterial whether the slots or grooves are machined or cast, so long as the inserts are joined to the plastic body. In further particular, it does not matter that the body 14 is formed before or after formation of the inserts or rings. Thus, the rings 22, 26 and 28 may be formed separately and placed in a bullet-shaped mold or cavity, and the plastic body then formed later on. In any event, the various alternatives proposed for the construction or fabrication of the pig 10 are offered by way of illustration and not limitation.

The foregoing manufacturing techniques noted with respect to the ring members also applies to the spiral members 32 and 34. Also, the transversely extending impervious member 30 may be formed separately of the body and joined thereto later, or may be cast integrally therewith. It is immaterial at what juncture and process of manufacture the member 30 is attached to the body 14 and to the ring member 28.

The foregoing has been direced to the preferred embodiment of the present invention. Clearly, the number of rings in the preferred embodiment may be varied from one ring upward to provide a wearing member which receives the brunt of the abrading action as the pig traverses the pipeline. Further, the spiral members 32 and 34 may be omitted as desired. The pig may be measurable in length, or may be relatively short, but in the event it is quite long, two, three or more inserts may be included at spaced locations along the body. The dimensions of each insert may be varied, but it is preferable to provide adequate material and bearing surface to clean the pipeline while providing a wear member which is of long life, and as a consequence, the life of the pig is measurably extended. As noted above, it is conceivable to obtain several hundred miles of cleaning use from the present invention, far exceeding the capabilities of apparatus known heretofore.

The foregoing has been directed to the preferred embodiment of the present invention, and some variations have been suggested. Other variations may be adapted by those skilled in the art. The terminology used herein is applied to the claims which are appended hereto.

What is claimed is:

1. A pipeline pig adapted to be passed through a pipeline for clearing same of an accumulation of debris and other mater, which comprises an elongate cylindrical body having a cross section contacting the inner wall of the pipeline, said cylindrical body having a leading edge which includes the point of contact of the pig against the pipeline, and a ring member in said body at the point of contact against the pipeline, said ring member being of increased hardness when compared to that of the body of the pig for sustaining the bulk of the wear of the pig as it traverses the pipeline, and spiral members extending about the cylindrical body of said pig and being of a harder material than that of said body, said spiral members adapted to bear against the pipeline to impart a twist or rotation to the pig as it traverses the pipeline.

2. The invention of claim 1 wherein said body is a foamed plastic mass and said ring member is an elastomer approximating seventy durometer hardness.

3. The invention of claim 1 including a second ring member mounted flush with the cylindrical body portion of said pig and being located at the rearward line of contact of the cylindrical body against the pipeline.

4. A pipeline pig adapted to be passed through a pipeline for clearing same of an accumulation of debris and other matter, which comprises an elongate cylindrical body having a cross section contacting the inner wall of the pipeline, said cylindrical body having a leading edge which includes the point of contact of the pig against the pipeline, and a ring member in said body at the point of contact against the pipeline, said ring member being of increased hardness when compared to that of the body of the pig for sustaining the bulk of the wear of the pig as it traverses the pipeline, and a second spaced ring member along the cylindrical body of said pig, there being a spiral member between said ring members for imparting a twist to said pig as it traverses the pipeline.

References Cited

UNITED STATES PATENTS

| | | | |
|---|---|---|---|
| 3,204,274 | 9/1965 | Knapp | 15—104.06 |
| 3,403,418 | 10/1968 | Knapp et al. | 15—104.06 |

EDWARD L. ROBERTS, Primary Examiner

Notice of Adverse Decision in Interference

In Interference No. 97,909, involving Patent No. 3,538,531, K. M. Knapp and M. M. Knapp, PIPELINE PIG, final judgment adverse to the patentees was rendered Apr. 26, 1974, as to claims 1, 3 and 4.

[*Official Gazette October 1, 1974.*]